United States Patent [19]

Koivunen

[11] 4,159,653

[45] Jul. 3, 1979

[54] TORQUE-EQUALIZING MEANS

[75] Inventor: Erkki A. Koivunen, Livonia, Mich.

[73] Assignee: General Motors Corporation, Detroit, Mich.

[21] Appl. No.: 839,649

[22] Filed: Oct. 5, 1977

[51] Int. Cl.$^2$ .................... F16H 15/32; F16H 15/36; F16H 15/38
[52] U.S. Cl. ........................................ 74/200; 74/196; 74/208; 74/199
[58] Field of Search ................ 74/198, 200, 201, 199, 74/190, 208, 194

[56] References Cited

U.S. PATENT DOCUMENTS

| Re. 26,917 | 6/1970 | Dickenbrock | 74/200 |
|---|---|---|---|
| 2,131,158 | 9/1938 | Almen et al. | 74/200 |
| 2,446,409 | 8/1948 | Chilton | 74/200 |
| 3,739,658 | 6/1973 | Scheiter | 74/200 |

FOREIGN PATENT DOCUMENTS

| 443472 | 2/1936 | United Kingdom. | |
|---|---|---|---|
| 1280987 | 7/1972 | United Kingdom | 74/200 |

Primary Examiner—Samuel Scott
Assistant Examiner—William R. Henderson
Attorney, Agent, or Firm—Donald F. Scherer

[57] ABSTRACT

Torque-equalizing means for a dual section toric or toroidal roller and race type transmission, including a balance lever pivotally mounted on the transmission housing, with oppositely disposed pivot members formed on the balance lever and pivotally connected to first and second reactive or grounding members of the respective dual roller sections for permitting the grounding members to react to any excess torque of either section resulting from a build-up of manufacturing tolerances of the components of the respective sections, the balance lever being caused to pivot as required to equalize the torques in the dual sections.

4 Claims, 8 Drawing Figures

TORQUE-EQUALIZING MEANS

This invention relates generally to traction drive type transmissions and, more particularly, to torque-equalizing means for a transmission having two traction drive sections.

In such a two-section traction drive unit, the torque-flow is divided into two parallel paths, with each section ideally carrying one-half of the total torque, as would be the case if both sections operated at precisely the same ratio. However, in actual practice, normal manufacturing tolerance deviations and the attendant variable deflections under load generally cause the two sections to operate at slightly different ratios, which would cause unequal loading. Should either section be substantially overloaded, such section may be caused to slip to the extent that it becomes damaged.

Heretofore, differential gear or differential roller units of the types shown and described in U.S. Pat. No. 3,739,658, issued in the name of Milton H. Scheiter, have been satisfactorily used. However, such arrangements tend to be quite expensive to manufacture.

Accordingly, a general object of this invention is to provide improved torque-equalizing means which is simple, efficient, and economical.

Another object of the invention is to provide improved torque-equalizing means for a dual traction drive type transmission, including means for providing for opposite independent movements of the reactive or grounding members of the traction drive sections, in response to any reactive force thereon as a result of typical variations in component dimensions due to manufacturing tolerances, until a torque balance is attained therebetween.

A further object of the invention is to provide a dual section traction drive, "toric-type" transmission, including a pivotable balance lever operatively connected to respective support members of the dual sections and providing for pivotal movements of the support members in response to the difference in reactive forces between the sections due to assembly variations resulting from a build-up of manufacturing tolerances, and attaining a balanced condition, thereby improving efficiency and diminishing the possibility of damage within the respective sections.

These and other objects and advantages of the invention will be apparent when reference is made to the following description and accompanying drawings wherein.

Figure 2:
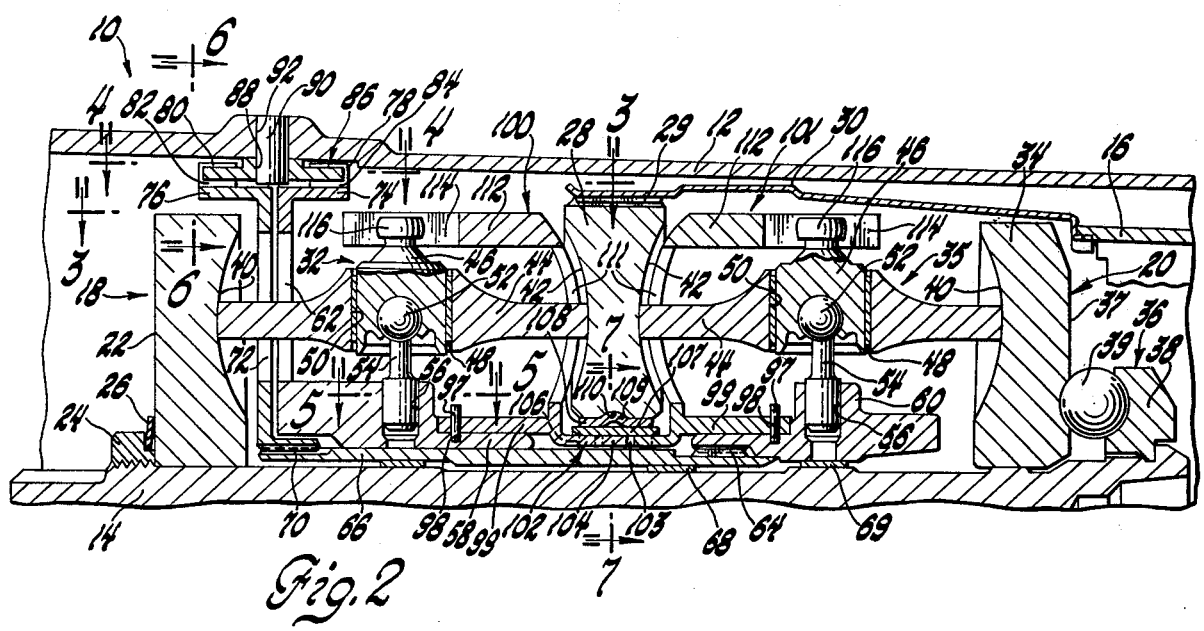
FIG. 2 is a fragmentary cross-sectional view of a toroidal or toric transmission embodying the invention.
Figure 3:
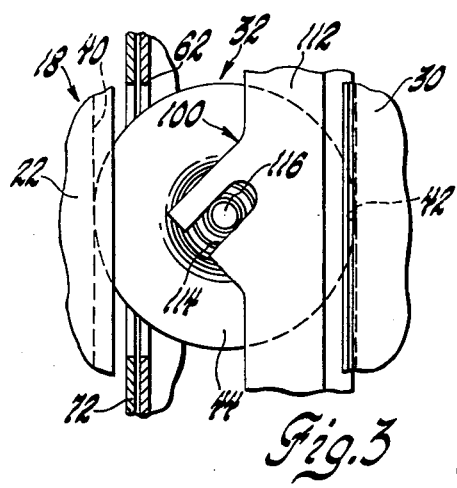
Figure 4:
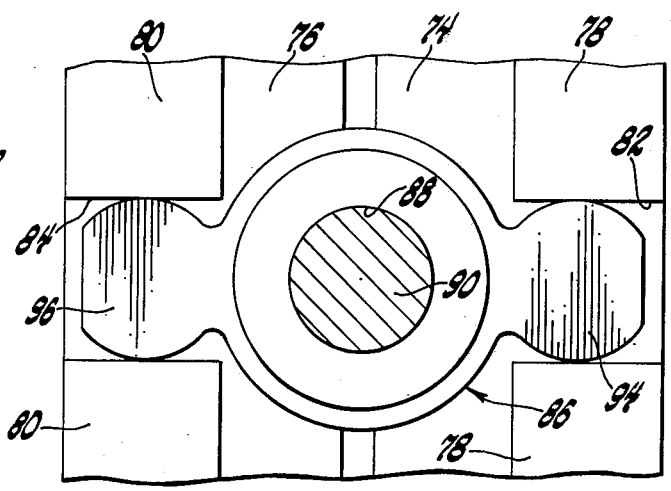
Figure 5:
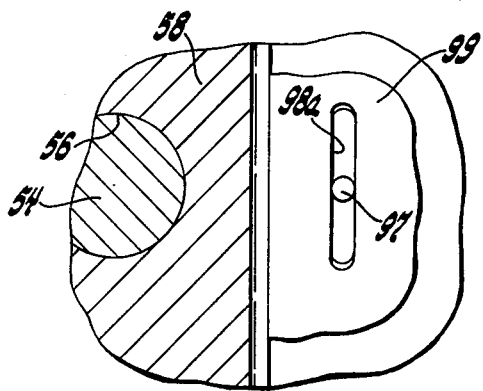
Figure 6:
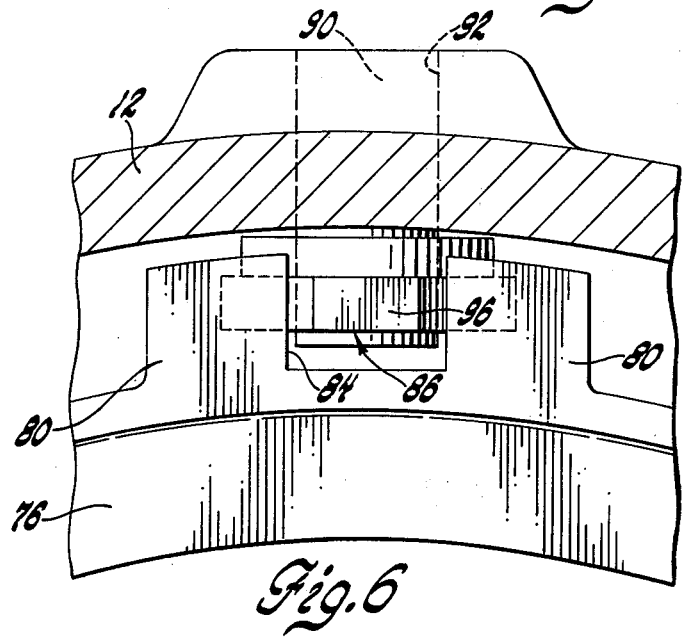
Figure 7:
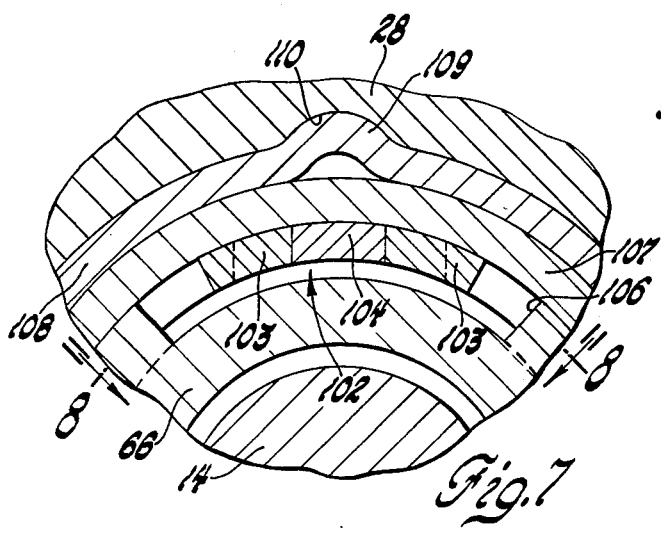
Figure 8:
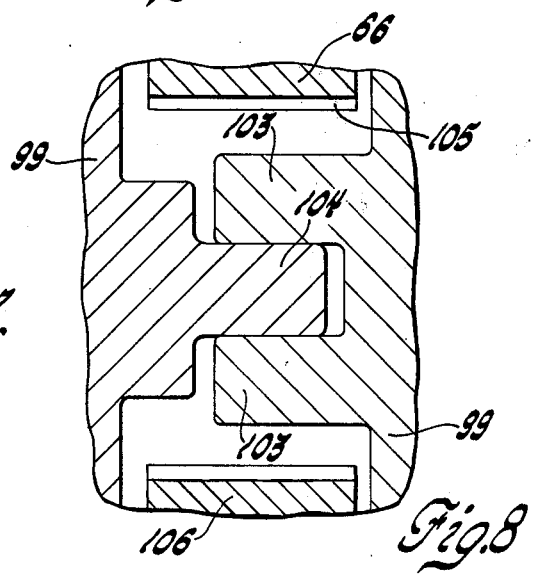

FIGS. 3–7 are fragmentary cross-section views taken along the planes of lines 3—3, 4—4, 5—5, 6—6 and 7—7 of FIG. 2, respectively, and looking in the direction of the arrows; and FIG. 8 is a fragmentary cross-sectional view taken along the plane of line 8—8 of FIG. 7, and looking in the direction of the arrows.

Figure 1:
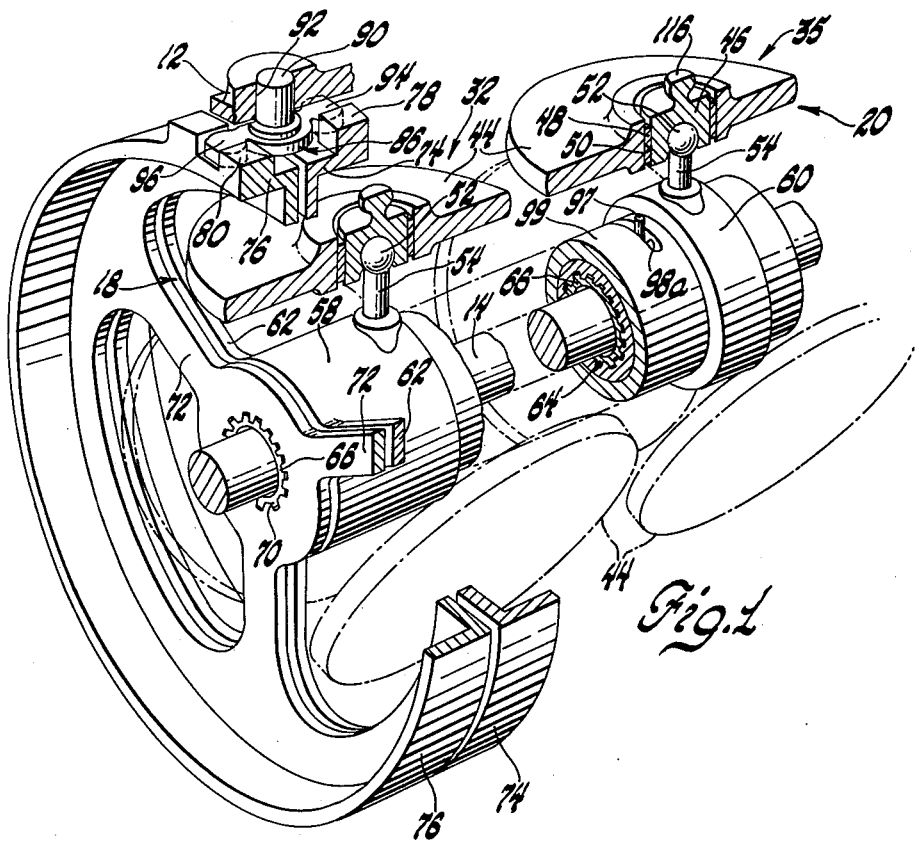
FIG. 1 is a fragmentary perspective view of a toroidal or toric transmission embodying the invention.

Referring now to the drawings in greater detail, FIGS. 1 and 2 illustrate a toroidal or toric transmission 10 including an outer casing or housing 12, an input shaft 14, an output sleeve shaft 16, and two toric traction drive sections 18 and 20.

In general, the toric section 18 includes a first input race 22 secured in any suitable manner on the input shaft 14 adjacent a collar 24 threadedly mounted on the leftmost end (FIG. 1) thereof, with a Belleville spring 26 mounted therebetween, and an output race 28 secured in any suitable manner, such as by splines 29, to one end of a sleeve-like member 30 connected at its other end to the output sleeve shaft 16. A first set of a predetermined number, say, three, of equally-spaced, traction drive type roller assemblies 32 is rotatably mounted between the races 22 and 28.

The toric section 20 includes a second input race 34 mounted on the input shaft 14 for rotation therewith while being axially movable thereon. The output race 28 is common to both toric sections 18 and 20 in a manner to be described. A second set of the predetermined number of roller assemblies 35 is mounted between the races 28 and 34. An axial loader mechanism 36 is mounted on the right-hand end (FIG. 1) of the input shaft 14 adjacent the outer face 37 of the second input race 34, the mechanism 36 including the usual ramped member 38 splined to the input shaft 14, and a plurality of ball members 39 mounted between the ramped member 38 and a converging ramp (not shown) formed on the outer face 37 of the input race 34, for urging such axially movable input race 34 and, in turn, the output race 28, against the respective circumferential edges of intermediate traction drive roller assemblies 35 and 32 as a function of input torque.

In greater detail, each input race 22 and 34 includes a toroidal-shaped surface 40 formed on the inner surface thereof, while the common output race 28 includes a toroidal-shaped surface 42 formed on each side surface thereof. Each roller assembly 32 and 35 includes a roller 44 rotatably mounted on a carrier 46 via sleeve bearings 48 mounted between the carrier 46 and the surface of a central opening 50 formed in each roller 44. The carrier 46, in turn, is adapted to being mounted on a spherical end 52 formed on a mooring mast 54. The latter is press-fitted into a radial opening 56 formed in each of respective central hub members 58 and 60.

The central hub member 58 is mounted in a manner to be described, and has integrally formed on an end thereof one or more radially extending support spokes or members 62. The central hub member 60 is secured at one end thereof by splines 64 to one end of a cylindrical member 66 mounted on bearings 68 around the transmission input shaft 14. The hub member 60 is supported at an intermediate point therealong by bearings 69 on the input shaft 14. The cylindrical member 66 is freely extended through the central hub member 58, with splines 70 formed on the other end thereof for press fit connection thereto of the hub portion of the support member 72, the latter extending adjacent the support members 62. The members 62 and 72 are located intermediate adjacent rollers 44 within the first traction drive section 18. At their respective outer ends, the members 62 and 72 are secured to respective ring members 74 and 76. Collars 78 and 80 (FIG. 4), forming pockets or slots 82 and 84, respectively, are formed on the outer surfaces of the respective ring members 74 and 76, rotatably mounted within the housing 12. A balance lever 86, having a central opening 88, is pivotally mounted on a pivot pin 90 press-fitted into an opening 92 formed in the transmission housing 12. Substantially circular-shaped pivot members 94 and 96 are formed on the balance lever 86 for extension into the respective pockets or slots 82 and 84 for a purpose to be described.

The cam assemblies 100 and 101 are restrained from axial movement by respective pin members 97 press-fitted into openings 98 formed in the hub members 58 and 60 and extending through circumferential slots 98a (FIG. 5) formed in respective overlapping inner sleeve-portions 99 of respective cam assemblies 100 and 101. The inner sleeve-portions 99 are each permitted some circumferential movement in the slots 98a and are interconnected by a central spline arrangement 102 consisting of interdigitated finger-like members 103 and 104 (FIGS. 7 and 8) extended through an arcuate opening 106 formed on the cylindrical member 66. A sleeve 107 is press-fitted on the cylindrical member 66 to provide a support for the output race 28. A bearing 108 is mounted between the sleeve 107 and the common output race 28, retained axially by a protrusion 109 formed on the bearing 108 for extension into an annular groove 110 formed in the output race 28. Radially extending spoke members 111 serve to interconnect the inner sleeve-portions 99 to respective outer control collars 112, the spoke members 111 being located intermediate adjacent rollers 44 of the respective roller assemblies 32 and 35.

Angularly disposed cam grooves 114 (FIG. 3) are formed in the control collars 112 to accommodate the slidable movement therein of respective cam extensions 116 formed on the outer ends of the respective carriers 46. Operation and construction of the cam assemblies 100 and 101 may be substantially in accord with the operations and constructions of the respective cam assemblies illustrated and described in U.S. Pat. No. 3,574,289 issued in the names of Milton H. Scheiter and Frank Dickenbrock, and U.S. Pat. No. 3,581,587 issued in the name of Frank Dickenbrock. The detailed descriptions and illustrations of the essential components of these patents and their attendant operations are incorporated herein by reference, but do not form a part of this invention. Briefly, however, input from a suitable prime mover, such as a gas turbine engine (not shown), is transmitted therefrom to the input shaft 14 and thence to the input races 22 and 37. If such input is assumed to be in a clockwise direction, as viewed from the left end of FIG. 1, the rollers 44, which frictionally engage the toroidal surface 40, will be caused to rotate in a counter-clockwise direction in unit 18 and clockwise in unit 20, as viewed from the top. The rotating rollers 44 will, in turn, cause the output race 28 to rotate in a counter-clockwise direction by virtue of their frictional engagement with the roroidal surface 42.

At this point, it toroidal be appreciated that if the roller 44 is tilted between the toroidal surfaces 40 and 42, the speed of the output race 28 will be varied accordingly. For example, if the left contacting edge of each roller 44 is moved radially outwardly along the toroidal surface 40 while the right edge is moved radially inwardly along the toroidal surface 42, there will result an increased output speed for a given input speed. Conversely, if the tilted positions of the respective contacting edges are reversed, there will result a decreased output speed, but with all the components continuing to rotate in the same respective directions.

To accomplish the tilting operation, it is conventional to cause the disc rollers 44 to first be inclined between the respective input and output races 22 and 28 as a result of rotation of one of the ratio control collars 112 via any suitable manual or hydraulic means, such as the servo-piston assembly 546, shown in FIG. 4b of U.S. Pat. No. 3,574,289 including the servo-piston 118, shaft 588, and bellcranks 114, the latter being secured to shaft 104 of FIG. 3, which, in turn has crankarm 102 mounted on an end thereof, including a slot 106 for receiving a shaft 104 mounted on a ratio control collar 90. The latter and its grooves 88 are comparable to the ratio control collar 112 and its angularly disposed cam grooves 114 shown in FIGS. 1 and 3 of this application. There results an equal rotation of the other outer control collars 112 via the interdigitated finger-like members 103 and 104. Since the slots 114 are angularly disposed on the control collars 112, it may be realized that the initial rotation of the slot 114 of the cam assembly 100, for example, will cause the spin axis of cam extension 116 to incline in a plane parallel to the planes of the input and output races 22 and 28. The rollers 44 will likewise be initially inclined about an inclination axis running between the areas of contact between the roller edges and the adjacent toroidal surfaces 40 and 42, such that the spin axis moves through an angle of inclination with respect to the axis of the input shaft 14. Having initially pivoted only about the inclination axis, the inclination of the rollers 44 generates forces at the areas of contact with the surfaces 40 and 42, causing the rollers 44 to tilt with respect to the inclination axis, causing the roller contacts to move in opposite radial directions along the toroidal surfaces 40 and 42, thereby changing the drive ratio. As each of the rollers 44 tilts, it pulls the carrier 46 and its associated cam extension 116 along with it, causing the extension 116 to move along its respective slot 114 until the previously described angle of inclination has returned to zero. For each rotary position of the collars 112, there results a corresponding tilt angle for the rollers 44. Whether the output/input speed ratio is increased or decreased depends upon whether the control collar 112 is rotated in a clockwise or a counter-clockwise direction. Of course, as a result of the interdigitated finger-like members 103 and 104 (FIGS. 7 and 8), there results an equal rotation of the other control collar 112 and actuation of its associated rollers 44.

With respect to the torque-equalizing function of the present invention, utilizing the components 58–96 described above, there is included means for providing for the independent movements of the reactive or grounding support members 62 and 72 of each of the two toric sections 18 and 20 in opposite directions, in response to unequal reactive forces within the respective sections 18 and 20, until a torque balance is achieved as a result of comparable ratio changes in each section.

More specifically, assume, for purposes of illustration, that the tilt angles of the respective rollers 44 of the rear roller assemblies 35 in the second or rear traction drive section 20 are initially such that, at a particular ratio position, the speed ratio of the section 20 is higher than that of the front section 18, due to the manufacturing tolerances of the various components involved. As a result, the forces between the edges of the rear rollers 44 and the common output race 28 are greater than the forces between the edges of the front rollers and the common output race, producing a force in the opposite direction on the rear mooring mast 54 greater than the force on the front mooring mast. The torque transmitted by such rear section 20 is consequently higher than that transmitted by the front section 18, with the result that the forces acting on the balance lever 86 via the support members 72 and 62 and respective ring members 74 and 76 are not equal, the force on the pivot member 96 in the slot 84 being higher than the force on the pivot member 94 in the slot 82. Since the balance lever 86 is pivotally mounted around the pivot pin 90, the lever will pivot, allowing the ring member 76 to move in the direction of the reactive force and thus force the ring member 74 to move in the opposite direction. This will cause the rollers 44 in the rear section 20 to tilt toward underdrive, reducing the torque carried by this section. In the front section 18, the opposite reaction occurs, as a result of the movement of the ring member 74, with the transmitted torque, as well as the speed ratio thereof, being increased.

Specifically, the pivotal reaction of the pivot members 94 and 96 to the above-mentioned higher torque on the support member 72 moves the collars 80 and 78, and their associated ring members 76 and 74, and hence, the members 72 and 62 in opposite directions, thereby effecting (1) rotational movement of the cylindrical member 66 and its associated central hub member 60 and mooring mast 54 in one direction in response to the movement of the member 72, and (2) corresponding rotational movement of the central hub member 58 and mooring mast 54 in the opposite direction. This initial movement of the mooring mast 54 causes the rollers 44 to initially incline such that the spin axis thereof moves through an angle of inclination with respect to the axis of the input shaft 14. As described above, the resultant generation of forces at the areas of contact causes the rollers 44 in the rear section 20 to tilt with respect to the inclination axis about the spherical end 52 toward underdrive, thereby reducing the torque carried by this section, while causing the rollers in the front section 18 to tilt in the opposite direction toward overdrive. There results a balanced condition wherein the torques in the front and rear traction drive sections 18 and 20, respectively, are substantially equal, thereby improving efficiency and diminishing possibility of damage within the respective sections 18 and 20. It's apparent that, at different ratio positions, the manufacturing tolerances may be such that a different corrective action of the balancing lever 86 will occur, as required for a balanced condition between the sections 18 and 20.

It should be apparent that the invention provides an improved torque-equalizing means which is simple, efficient, and economical.

While but one embodiment of the invention has been shown and described, it should also be apparent that, in lieu of the pivotable balance lever 86, other arrangements, such as springs (not shown), or hydraulic means (not shown), for example, could be employed between the respective support members 62 and 72 and the casing or housing 12, or a controlled flexibility could be designed into support members 62 and 72 secured to the casing 12, with substantially comparable torque-reaction results.

The embodiments of the invention in which an exclusive property or privilege is claimed are defined as follows:

1. In a transmission including a housing, input means, output means, and dual traction drive transmission sections operatively connected therebetween, each of the sections including input and output annular race means and a plurality of rollers rotatably disposed therebetween with opposed portions of the circular perimeters thereof in frictional contact with the input and output annular race means, torque-equalizing means for equalizing the torque in the dual traction drive sections, said torque-equalizing means comprising first and second sets of support means for each of the pluralities of rollers of the dual traction drive sections, first and second support members secured at one end thereof to the first and second sets of support means, respectively, a balance lever pivotally mounted on the housing, and oppositely disposed pivot members formed on the balance lever and operatively connected to the other ends of the respective first and second support members for pivoting about the axis of the balance lever in response to any higher torque being transmitted by the pluralities of rollers of one of the dual traction drive sections as compared to the other of the dual traction drive sections as a result of the build-up of manufacturing tolerances within the respective dual sections, to thus permit the two pluralities of rollers to attain a torque balance as a result of comparable ratio changes occurring in each of the dual sections.

2. In a transmission including a housing, input means, output means, and dual traction drive transmission sections operatively connected therebetween, each of the sections including first and second annular race members and a plurality of rollers rotatably disposed therebetween with opposed portions of the circular perimeters thereof in frictional contact with the first and second annular race members, torque-equalizing means for equalizing the torque in the dual traction drive sections, said torque-equalizing means comprising first and second central hub members, first and second masts secured at one end thereof to respective first and second central hub members and rotatably connected at the other end thereof to the center of each of the plurality of rollers, a sleeve extension secured to the second central hub member, first and second support members secured at one end thereof to the first central hub member and to the sleeve extension, respectively, an annular member secured to the other end of each of said first and second support members, balance means operatively connected to said annular members for reacting in response to any higher torque being transmitted by the pluralities of rollers of one of the dual traction drive sections as compared to the other of the dual traction drive sections as a result of the build-up of manufacturing tolerances within the respective dual sections, to thus permit the two pluralities of rollers to attain a torque balance as a result of comparable ratio changes occurring in each of the dual sections.

3. In a toric transmission including a housing, an input shaft, an output sleeve shaft, and dual traction drive transmission sections, each of said sections including a first annular race member secured to said input shaft, a common second annular race member secured to said output sleeve shaft, and a plurality of rollers rotatably disposed between said first annular race member and said second common annular race member with opposed portions of the circular perimeters of said rollers being in frictional contact with said first and second annular race members, torque-equalizing means for equalizing the torque in said dual traction drive sections, said torque-equalizing means comprising first and second central hub members, first and second sets of masts, each secure at one end thereof to said respective first and second central hub members and rotatably connected at the other end thereof to the center of each respective roller of said pluralities of rollers, a sleeve extension secured to said second central hub member and mounted on bearings around said input shaft, said first central hub member being mounted freely around said sleeve extension and said second central hub member being mounted on bearings around said input shaft, first and second sets of support spokes secured at the inner ends thereof to respective adjacent ends of said first central hub member and said sleeve extension, first and second ring members formed around the outer ends of each of said first and second sets of support spokes, respectively, a balance lever pivotally mounted on said housing, and oppositely disposed pivot members formed on said balance lever and operatively connected to said respective first and second ring members for pivoting about the axis of said balance lever in response to any higher torque being transmitted by said respective pluralities of rollers of one of said dual traction drive sections as compared to the other of the dual traction drive sections as a result of the build-up of manufacturing tolerances within said respective dual sections, to thus permit said two pluralities of rollers to attain a torque balance as a result of comparable ratio changes occurring in each of said dual sections.

4. In a toric transmission including a housing, an input shaft, an output sleeve shaft, and dual traction drive transmission sections, each of said sections including a first annular race member secured to said input shaft, a common second annular race member secured to said output sleeve shaft, and a plurality of rollers rotatably disposed between said first annular race member and said second common annular race member with opposed portions of the circular perimeters of said rollers being in frictional contact with said first and second annular race members, torque-equalizing means for equalizing the torque in said dual traction drive sections, said torque-equalizing means comprising first and second central hub members, first and second sets of masts, each secured at one end thereof to said respective first and second central hub members and rotatably connected at the other end thereof to the center of each respective roller of said pluralities of rollers, a sleeve extension secured to said second central hub member and mounted on bearings around said input shaft, said first central hub member being mounted freely around said sleeve extension and said second central hub member being mounted on bearings around said input shaft, first and second sets of support members secured between said housing and said first central hub member and said sleeve extension, respectively, said first and second sets of support members each having a predetermined flexibility for yielding in response to any higher torque being transmitted by said respective pluralities of rollers of one of said dual traction drive sections as compared to the other of the dual traction drive sections as a result of the build-up of manufacturing tolerances within said respective dual sections, to thus permit said two pluralities of rollers to attain a torque balance as a result of comparable ratio changes occurring in each of said dual sections.

* * * * *